March 29, 1966 J. M. BRANDSTADTER 3,242,820
LINEAR ACTUATOR
Original Filed March 27, 1961
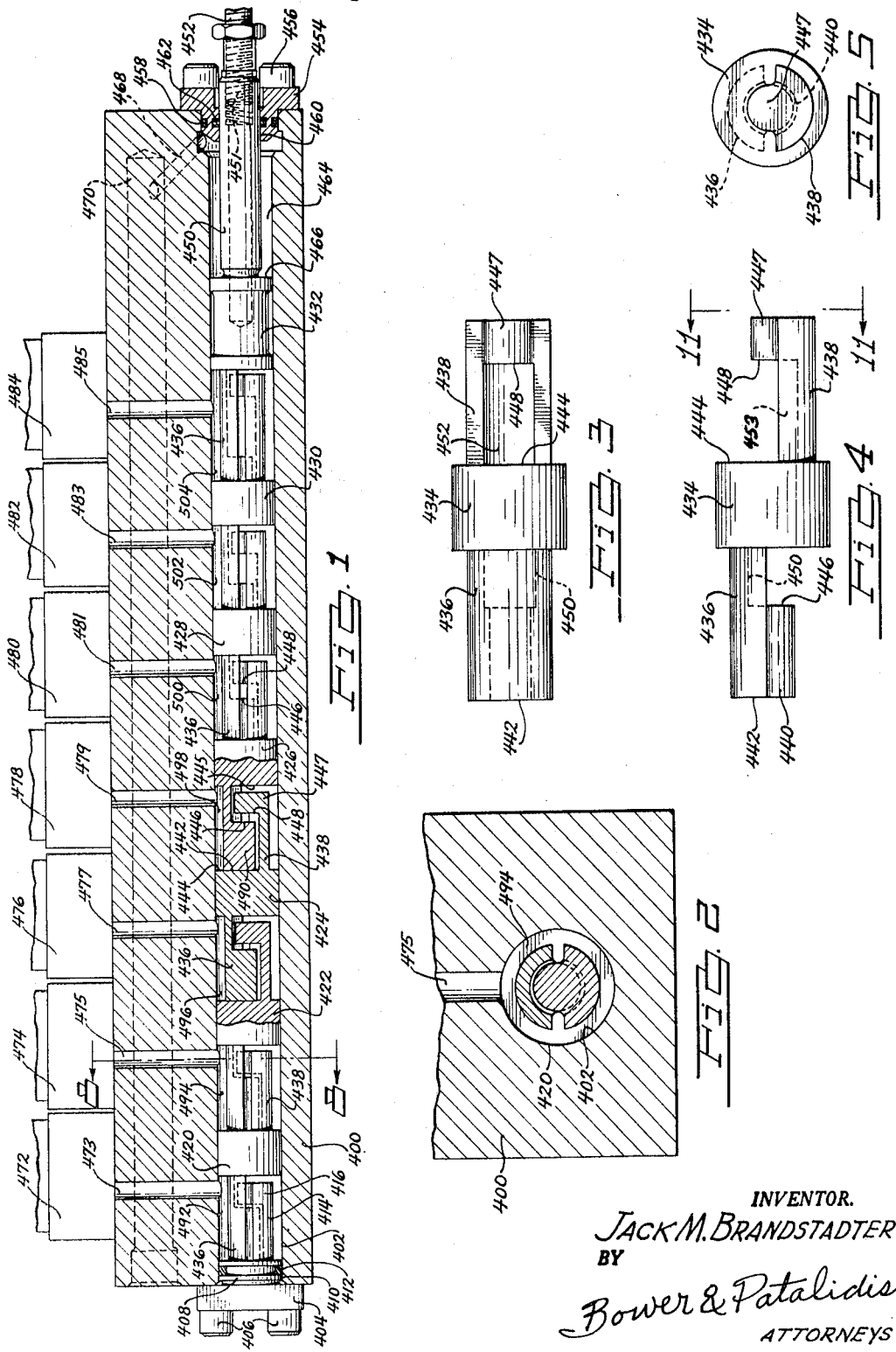
INVENTOR.
JACK M. BRANDSTADTER
BY
Bower & Patalidis
ATTORNEYS

United States Patent Office 3,242,820
Patented Mar. 29, 1966

3,242,820
LINEAR ACTUATOR
Jack M. Brandstadter, Royal Oak, Mich., assignor to Cadillac Gage Company, Roseville, Mich.
Original application Mar. 27, 1961, Ser. No. 98,549, now Patent No. 3,141,388, dated July 21, 1964. Divided and this application Dec. 13, 1963, Ser. No. 347,638
3 Claims. (Cl. 91—167)

This is a division of application Serial No. 98,549, now Patent No. 3,141,388, issued July 21, 1964.

This invention relates to improvements in linear actuators, and more particularly relates to servo-mechanisms for linearly positioning a shaft by fluid means in response to selective input signals.

In the art of data processing, digital computers, machine-tools, automation, and the like, there exists a need for devices which accurately position a shaft or a movable reference output element in response to information applied to the input of the device. Various servo-mechanisms of this nature have been proposed; they may be actuated by electrical means or by purely mechanical means. It is an object of this invention to provide a linear shaft actuator and positioner which is selectively operated by fluid pressure means. The fluid may be oil, water, compressed air, a gas, steam, or any other like fluid.

The transmission of control information in systems of the character herein mentioned is commonly carried out in the binary numerical system. It is frequently desirable to convert the digital representation of the binary number into an analogue equivalent such as the linear position of a movable reference output element or an angular shaft rotation. It is, therefore, another object of this invention to provide selectively operable fluid motor means for converting a binary information into an analogue equivalent in the form of a linear shaft position. It is apparent to those skilled in the art that such an analogue linear displacement and positioning can be easily converted, in applications where so desired, into an angular shaft rotation and positioning through a simple rocker arm assembly, rack and pinion assembly, or the like.

It is a further object of this invention to provide a compact, self-contained, fluid motor powered binary to linear shaft position converter.

It is another object of this invention to provide a linear actuator utilizing a relatively small number of simple elementary identical parts in order to reduce manufacturing cost and inventory.

It is an additional object of this invention to provide a linear actuator developing a great power with practically no lag in operation and almost instantaneous response.

It is a further object of this invention to provide a linear actuator having a number of discrete positions which correspond to the formula $N=2^n$, in which N denotes the number of discrete positions and $n$ denotes the number of individual unit elements being placed in series within a common housing. For example, if it is desired to provide for 8 different discrete positions of the output reference element, the number of unit elements or stages to be used is 3; if 128 discrete positions are required, 7 unit elements, or stages, must be placed within the housing.

A further object of this invention is to have a predetermined number of discrete positions which are accurately repeatable *ad infinitum*, together with positive indexing at each discrete position.

Still a further object of this invention is to provide a linear actuator which has a response time that can be tailored according to the requirements of the controlled equipment and which has positive dampening of the acceleration and deceleration of the movable shaft.

An additional object of this invention is to provide a device which can utilize readily available pressure fluid hardware, tubings, valves, accumulators, and the like.

Another object is to provide a functional unit endowed with high reliability and long life.

Additional objects and advantages of the invention will become apparent from the following description and appended claims, taken in connection with the accompanying drawings, which disclose, by way of example, the principles of this invention and some of the best modes which have been contemplated of applying these principles.

In the drawings:

FIG. 1 is a longitudinal cross-section view of an embodiment of the invention with some parts broken away to show their internal configuration;

FIG. 2 is a transversal cross-section view taken along line 8—8 of FIG. 1;

FIG. 3 is a top view of one of the component parts shown in FIG. 1;

FIG. 4 is a side elevation view of the part shown in FIG. 3;

FIG. 5 is an end view from line 11—11 of FIG. 4.

The embodiment of a linear actuator or positioner according to the principle of the invention is illustrated in FIGS. 1–5 as having seven stages, each stage consisting of only one slidable member disposed within the main bore of a housing. When actuated by fluid pressure, each stage member is adapted to travel a predetermined distance defined between abutments, displacing at the same time all the stages between it and the output shaft, and a combination of stages displaces the output shaft the sum of the strokes of the stages being actuated. The device is loaded toward its retracted position by supply fluid pressure acting upon a partial area of the seventh stage, in a direction opposite to the direction in which the individual stages travel when actuated.

In the drawings of FIGS. 1 and 2, a housing 400 having a cylindrical main bore 402 is closed on one end by an end cap 404, fastened thereon by means of the cap screws or bolts 406. The end cap has a shoulder-like integral portion 408 fitted into the housing bore and provided with a groove 410 and an O-seal ring 412. An integrally formed link 414 projects a certain distance into the bore and has an upturned end portion or flange 416. Within the main bore 402 is disposed a series of piston elements designed generally by numerals 420, 422, 424, 426, 428, 430 and 432, having a lap fit with the bore and being slidable therein.

FIGS. 3–5 show in detail one such piston element. A piston body 434 has an outside diameter adapted to slidably fit within the housing main bore. The body has two integrally formed L-shaped projecting extensions: a push rod 436 and a connecting link 438. Push rod 436 has a downturned end portion or flange 440 having an outer end face 442 adapted to abut against the side face 444 of the preceding piston, and an inner face or abutment surface 446. Connecting link 438 has an upturned end portion or flange 447 with an inner face or abutment surface 448. A longitudinal notch or groove 450 in the stem or push rod 436 gives the required clearance for the flange 447 of the preceding piston connecting link. A longitudinal notch or groove 453 in the stem of the connecting link 438 gives, in a similar fashion, the required clearance for the flange 440 of the following piston push rod.

Such an arrangement prevents each piston element from rotating relatively to the piston elements adjacent thereto, and from tilting so as to become wedged in the bore.

FIG. 1 shows how the piston elements are interlinked within the main bore 402. The first piston element 420 has its push rod 436 interlinked with the projecting element 414 integral with the end cap 404. The second piston element 422, and all the subsequent piston elements have the end faces 442 of their respective push rods 436 in contact with the side 444 of the preceding piston when the device is in a retracted position as shown in FIG. 1. The last piston, 432, has a reduced diameter rod-like portion 450 adapted to receive the output shaft 452 adjustably fastened in a threaded bore 451 disposed substantially along the axis of rod-like portion 450. An end cap 454 is fastened upon the housing by the cap screws or bolts 456. The end cap has a groove with an O-ring seal 458 to prevent leakage to the outside of the housing, and a bore 460 with a groove and an O-ring seal 462 to allow the rod-like portion 450 to slide in and out from the housing. The annular chamber 464, thus disposed between the end face 466 of the piston 432 and the inner face of the end cap 454, is filled with pressure supply fluid admitted through passageway 468 from manifold 470. The fluid exerting a pressure upon the face 466 of piston 432 furnishes the biasing force necessary to retract the device in the same manner as hereinbefore explained in connection with the preceding embodiments of the invention.

Control valves 472, 474, 476, 478, 480, 482 and 484 are disposed on the housing 400 to control the stages of the actuator by admitting or exhausting pressure supply fluid through the passageways 473, 475, 477, 479, 481, 483 and 485. Fluid is thus admitted, as required, in the corresponding chambers 492, 494, 496, 498, 500, 502 and 504 where pressure is exerted on the opposing faces of two consecutive pistons forming the end walls of the respective chambers. For example, if fluid is admitted into chamber 498, when the device is in a retracted position, pressure will be exerted upon face 444 of piston 424 and upon face 445 of piston 426. Piston 424 cannot move because the end face of its push rod 436 abuts against the adjacent face of the preceding piston 422. Piston 422 cannot move for the same reason, i.e., because its push rod abuts against the adjacent face of the next preceding piston 420 which, in turn, is prevented to move by its own push rod abutting against the face of the end plate shouldered portion 408. However, the fluid pressure in chamber 498 acting upon the face 445 of piston 426 pushes piston 426 until the abutment 446 contacting the abutment 448 prevents further travel. Piston 426 has thus travelled a distance $d$ which is equal to the distance separating the two abutments 446 and 448 when the device was at rest. The travel or stroke of piston 426 is transmitted to the next following piston through the push rod 436 integral with the next following piston 428. In the same manner, the linear displacement of piston 428 is transmitted to piston 430 and to piston 432, the latter displacing the output shaft 452 of the same quantity $d$.

If fluid is now admitted to chamber 500, piston 428 travels a distance $e$ which is its stroke as determined by the distance separating its own abutment 446 from the abutment 448 of the next preceding piston. As piston 428 had already travelled a distance $d$, its total travel is now $d+e$. This travel is transferred to piston 430 and from it to piston 432 and the output shaft 452 in the manner hereinbefore explained. Although the sequence has been arbitrarily chosen in such a way as to describe the events as taking place in succeeding order, for the sake of simplicity of explanation, operation of the different stages of the actuator may take place in any order or contemporaneously.

In this embodiment of the invention, the stroke of the first stage, piston 420, is arbitrarily chosen to be a quantity $a$. The stroke of the second stage, piston 422, is arbitrarily chosen to be a value $b$ twice that of $a$, and so on to the last stage, piston 432, which has a proper stroke $g$ which is twice that of the preceding stage $f$. Therefore, with seven stages as illustrated, 128 discrete positions are available including the fully retracted position 0 (binary 0000000) and the fully extended position (binary 1111111).

In the embodiment of the invention as shown, fluid pressure means acting upon an area of the last stage bias the actuator toward its retracted position. Other means, such as a coil spring, could be used as a biasing means without detracting from the scope and spirit of the invention.

A calibrated orifice to regulate the flow of biasing pressure fluid such as shown and described in connection with the embodiment of the invention forming the subject matter of co-pending application Serial No. 347,637 can also be used in combination with the present embodiment of the invention, if so desired. Also any number of stages may be used in the device instead of the seven stages as herein shown. For instance, an actuator comprising eight stages would give 256 possible discrete positions of the output shaft and an actuator having only five stages would give 32 possible discrete positions.

The device has been shown with a stationary housing and a movable shaft. However, the output shaft could be maintained stationary and the housing could be allowed to move without departing from the scope and spirit of the invention.

Although the illustrated embodiment has been shown with the most significant digit stage connected to the output shaft while the least significant digit stage was connected to the stationary reference, it is obvious that this arrangement could be reversed, or if so preferred, any order of digit stages could be used. It is also obvious that the device could be non-binary, and the ratio between stage strokes could be chosen as best fitting the purpose intended for the apparatus.

It is obvious that, for some special applications, several of such actuators as herein described and illustrated could be placed in series, in opposition or in parallel. For example, the output shaft of one actuator could be connected to the housing of another actuator in order to give a maximum resultant stroke which is the sum of the maximum strokes of each individual actuator. Two housings could be placed back to back or two actuators could be placed in a common housing with two output shafts movable through both ends of the housing.

The above example is given only for illustrative purpose of a few of the possible combinations contemplated and it will be apparent to those skilled in the art that there is a great number of such possible combinations.

It is obvious that various changes, additions and omissions of elements may be made in details within the scope and spirit of the invention; and it is, therefore, to be understood that the invention is not to be limited to the specific details, examples, and embodiment shown and described.

What is claimed is:

1. In a positioner for linearly positioning a movable reference element in relation to a stationary reference element, wherein said positioner comprises a stationary elongated housing defining the stationary reference element having a substantially cylindrical bore with an end closed by a first end plate and another end provided with a second end plate having a substantially centrally disposed opening, a slidable output shaft defining the movable reference element longitudinally movable through the opening in said second end plate, a plurality of cascaded motor stages slidably disposed end-to-end within the bore in said housing intermediate the closed end of said bore and the output shaft, a source of pressurized fluid, and valving and conduit means for selectively connecting and disconnecting the motor stages to and from the source of pressurized fluid, the improvement characterized by each one of said motor stages comprising:

a piston member having a body portion adapted to slidably fit within the bore in the housing and having a first and a second L-shaped extensions projecting from the opposite faces of said body portion, the first of said L-shaped extensions defining a push-rod element and the second of said L-shaped extensions defining a connecting link element, both said push-rod and connecting link elements being provided with a stem having an end flange portion disposed substantially at right angle to the axis of the piston member and having an inner end face and an outer end face, said end flange portion of the push-rod element being adapted to transversely project into a corresponding groove-like recess in the stem of the connecting link element associated with the next preceding piston member for preventing consecutive piston members from rotating and tilting relatively to each other, the inner end face of said end flange portion of the push-rod element being normally a predetermined distance away from the inner end face of the end flange portion of the connecting rod element interlinked therewith, the outer end face of said flange portion of the push-rod element being normally adapted to abut against the end face of the body portion of the piston member immediately preceding, said end flange portion of the connecting link element being adapted to project into a corresponding groove-like recess in the stem of the push-rod element associated with the next consecutive piston member for preventing consecutive piston members from rotating and tilting relatively to each other, the inner end face of said end flange portion of the connecting link element defining an abutment being normally said predetermined distance away from the inner end face of the end flange portion of the push-rod element and adapted to engage therewith for limiting the permissible travel of two consecutive piston members relatively to each other, the outer end face of said end flange portion of the connecting link element being normally a small distance away from the end face of the piston body portion of the next consecutive piston member, the stems of said push-rod element and of said connecting link element being symmetrically arranged relatively to the longitudinal axis of the piston member associated therewith and being disposed on alternate sides of an imaginary plane situated in said axis with the respective end flange portions thereof substantially at right angle to said axis and projecting centripetally relatively the bore in said housing, a connecting link element projecting from the inner side of the end plate closing the closed end of the bore in the housing which is adapted to cooperate with the push-rod element of the first one of said piston members, the last one of said piston members being devoid of connecting link element and being attached directly to the output shaft, the body portions of each pair of two consecutive piston members defining a substantially annular chamber disposed in the bore of said housing between such two body portions of consecutive piston members, port means in the bore of the housing for admitting pressurized fluid into each said annular chamber for causing displacement of the piston member situated towards the output shaft, thus displacing at the same time all the piston members between said piston member and the output shaft by means of the end face of the body portion of each of said piston members engaging the outer end face of the push-rod element of each consecutive piston member, the maximum travel of each piston member relatively to the piston member immediately preceding being limited by stop means defined by the inner end face of the end flange portion of each push-rod element and the inner end face of the end flange portion of each connecting link element, and biasing means exerted upon the last piston member in a direction that tends to maintain the outer end face of the end flange portion of the push-rod element of each piston member in contact with the corresponding end face of the next preceding piston body portion, and the outer end face of the end flange portion of the push-rod element of the first piston member in contact with the inner side of the end plate thereby biasing the actuator to its retracted condition.

2. The improvement as claimed in claim 1 wherein the biasing means is the pressurized fluid acting upon a shoulder area of the last piston member, said area being the end face of the body portion of said last piston member situated toward the output shaft and being substantially smaller than the effective area upon which said pressurized fluid exerts a force that causes the individual piston members to be displaced.

3. The improvement as claimed in claim 1 wherein the predetermined distance between the inner end face of the end flange portion of the connecting link elements and the inner end face of the end flange portion of the push-rod elements varies from stage to stage according to a binary series.

References Cited by the Examiner

UNITED STATES PATENTS

| | | | |
|---|---|---|---|
| 2,443,642 | 6/1948 | Rockwell | 60—54.5 |
| 2,699,757 | 1/1955 | Tornkvist | 91—167 |
| 2,969,042 | 1/1961 | Litz | 91—167 |
| 2,974,492 | 3/1961 | Gilovich | 91—167 |

OTHER REFERENCES

IBM Technical Disclosure Bulletin (vol. 1, No. 4, December 1958, pp. 22, 91–357).

SAMUEL LEVINE, *Primary Examiner.*

FRED E. ENGELTHALER, *Examiner.*

P. T. COBRIN, *Assistant Examiner.*